(12) United States Patent
Toyama et al.

(10) Patent No.: US 8,090,138 B2
(45) Date of Patent: Jan. 3, 2012

(54) AUDIO DEVICES FOR VEHICLES

(75) Inventors: Kouichi Toyama, Kariya (JP); Kiyoshi Ootani, Kobe (JP); Akira Nishikawa, Kobe (JP); Noboru Hidaka, Kobe (JP); Yuichi Nakajima, Kobe (JP)

(73) Assignees: Toyota Boshoku Kabushiki Kaisha, Aichi (JP); Fujitsu Ten Limited, Hyogo (JP)

( * ) Notice: Subject to any disclaimer, the term of this patent is extended or adjusted under 35 U.S.C. 154(b) by 1492 days.

(21) Appl. No.: 11/547,315

(22) PCT Filed: Apr. 14, 2005

(86) PCT No.: PCT/JP2005/007583
§ 371 (c)(1),
(2), (4) Date: Oct. 3, 2006

(87) PCT Pub. No.: WO2005/102780
PCT Pub. Date: Nov. 3, 2005

(65) Prior Publication Data
US 2008/0285769 A1 Nov. 20, 2008

(30) Foreign Application Priority Data
Apr. 19, 2004 (JP) ................... 2004-122864

(51) Int. Cl.
*H04R 25/00* (2006.01)
(52) U.S. Cl. .................. 381/396; 381/365; 381/431
(58) Field of Classification Search .................. 381/396, 381/412, 419, 420, 433, 365, 431
See application file for complete search history.

(56) References Cited

U.S. PATENT DOCUMENTS
3,356,796 A * 12/1967 Wray ........................... 381/433
(Continued)

FOREIGN PATENT DOCUMENTS
JP  10-318459  12/1998
(Continued)

*Primary Examiner* — Davetta W Goins
*Assistant Examiner* — Phylesha Dabney
(74) *Attorney, Agent, or Firm* — Pattersn Thuente Christensen Pedersen, P.A.

(57) ABSTRACT

A vehicle audio device includes a vibrator (30), a first threaded member (20), a second threaded member (32), and a ring-shaped resilient member (25). The first threaded member (20) includes a tubular portion (22), an external thread (22*m*) formed on an outer surface of the tubular portion (22), and a flange (24) formed on one end of the tubular portion (22). The resilient member (25) is fitted around the tubular portion (22) of the first threaded member (20) so as to axially oppose the flange (24) of the first threaded member (20). The second threaded member (32) includes a ring-shaped portion (32*f*) axially opposing the resilient member (25) from the side of the resilient member (25) not opposing the flange (24) of the first threaded member (20). Internal threads (32*w*) are formed on an inner surface of the ring-shaped portion (32*f*) and are engageable with the external threads (22*m*) of the first threaded member (20). The vibrator (30) is mounted to one of the first and second threaded members (20, 32). The other of the first and second threaded members (20, 32) is mounted to a vehicle interior trim panel (12). The resilient member (25) is clamped and resiliently deformed between the flange (24) of the first threaded member (20) and the ring-shaped portion (32*f*) of the second threaded member (32) through engagement between the external threads (22*m*) and the internal threads (32*w*).

13 Claims, 3 Drawing Sheets

U.S. PATENT DOCUMENTS

| | | | |
|---|---|---|---|
| 3,430,007 A | 2/1969 | Thielen | |
| 4,234,766 A * | 11/1980 | Cacho | 381/394 |
| 4,281,224 A * | 7/1981 | Castagna | 381/391 |
| 4,506,117 A | 3/1985 | Fresard | |
| 4,546,850 A * | 10/1985 | Litner | 181/141 |
| 4,951,270 A | 8/1990 | Andrews | |
| 4,997,059 A * | 3/1991 | See | 181/172 |
| 5,273,243 A * | 12/1993 | Abdallah et al. | 248/27.1 |
| 5,473,700 A * | 12/1995 | Fenner, Jr. | 381/336 |
| 5,699,438 A * | 12/1997 | Smith et al. | 381/386 |
| 5,731,551 A * | 3/1998 | Petrucci | 181/150 |
| 5,939,682 A * | 8/1999 | Hartmann | 181/150 |
| 6,258,438 B1 * | 7/2001 | Loveland et al. | 428/137 |
| 6,318,797 B1 * | 11/2001 | Bohm et al. | 296/210 |
| 6,332,029 B1 * | 12/2001 | Azima et al. | 381/152 |
| 6,377,695 B1 * | 4/2002 | Azima et al. | 381/152 |
| 6,519,349 B1 * | 2/2003 | Azima et al. | 381/396 |
| 6,968,069 B1 * | 11/2005 | Zhao | 381/345 |
| 7,050,593 B1 * | 5/2006 | Emerling et al. | 381/86 |
| 7,164,777 B1 * | 1/2007 | Stompler | 381/433 |
| 7,218,745 B2 * | 5/2007 | McConnell et al. | 381/302 |

FOREIGN PATENT DOCUMENTS

| | | |
|---|---|---|
| JP | 2001-263551 | 9/2001 |
| JP | 2002-166199 | 6/2002 |
| JP | 2004-515097 | 5/2004 |
| WO | WO 01/15489 A2 | 3/2001 |
| WO | WO 02/39781 A2 | 5/2002 |

* cited by examiner

AUDIO DEVICES FOR VEHICLES

This application claims priority to Japanese patent application serial number 2004-122864, the contents of which are incorporated herein by reference.

BACKGROUND OF THE INVENTION

1. Field of the Invention

The present invention relates to audio devices for vehicles and in particular to audio devices including vibrators that are mounted to interior trim panels of vehicles, which interior trim panels at least partially define the vehicle cabins, so that sound is produced due to vibrations applied to the interior trim panels by the vibrators.

2. Description of the Related Art

A known vehicle audio device of a type described above is disclosed in PCT International Publication WO/01/15489 as electromagnetic transducer assemblies in the form of sub-assembled drive motors. One of the sub-assembled drive motors is shown in FIGS. 5(A) and 5(B) and is labeled with reference numeral 90. The drive motor 90 generally includes a motor base 96 and a vibrator 92 coupled to the motor base 96. The motor base 96 is secured to a headliner 94 defining a surface of a vehicle cabin. A steel cap and a magnet configure the vibrator 92. The motor base 96 includes a tubular portion 96t and a flange 96f. The tubular portion 96t has an outer peripheral surface with external threads 96m. The flange 96f extends outward from the base end of the motor base 96. The motor base 96 is secured to the headliner 94 via the flange 96f.

The vibrator 92 further includes a ring-shaped guide member 93 disposed at a lower end of the vibrator 92. The guide member 93 has an inner peripheral surface with internal threads 93w. The vibrator 92 may therefore be mounted to the head liner 94 by engaging the internal threads 93w of the guide member 93 with the external threads 96m of the motor base 96 and thereafter tightening the internal threads 93w until the guide member 93 contacts the flange 96f of the motor base 96.

However, using this mounting structure of the vibrator 92 to the headliner 94 through the tightening of the internal threads 93w against the external threads 96m makes it likely that the tightened condition cannot be maintained due to potential loosening of the threaded connection during a long period of use. In particular, if the mount base 96 or the guide member 93 is made of resin, such loosening may easily occur when the temperature varies within the vehicle cabin, since the resin material typically has a large linear coefficient of thermal expansion. When loosening occurs, a clearance may be produced between the external threads 96m and the internal threads 93w, causing insufficient transmission of the audio vibration produced by a voice coil 92b of the vibrator 92. Consequently, the desired sound may not be effectively produced.

SUMMARY OF THE INVENTION

It is accordingly an object of the present invention to teach improved audio devices that can effectively produce sound without experiencing the potential loosening of a threaded mechanism coupling a vibrator or resonator to an interior trim panel.

In one aspect of the present teachings, audio devices are taught that are adapted to be mounted to an interior trim panel defining a surface of a vehicle cabin. The audio devices are adapted to vibrate the interior trim panel in order to produce audio sounds. The audio devices include a vibrator, a first threaded member, a ring-shaped resilient member, and a second threaded member. The first threaded member includes a tubular portion, an external thread formed on an outer surface of the tubular portion, and a flange formed on one end of the tubular portion. The ring-shaped resilient member is fitted around the tubular portion of the first threaded member and axially opposes the flange of the first threaded member. Here, the term "ring-shaped" is used to mean a complete circular ring or a partial circular ring, such as a C-shaped ring, which may include a cut portion along the circumference. The second threaded member includes a ring-shaped portion axially opposing the resilient member from a side surface not opposing the flange of the first threaded member. The second threaded member also includes internal threads formed on an inner surface of the ring-shaped portion and engageable with the external thread of the first threaded member. The vibrator is mounted to one of the first and second threaded members. The other of the first and second threaded members is mounted to the interior trim panel. The resilient member is clamped and resiliently deformed between the flange of the first threaded member and the ring-shaped portion of the second threaded member through engagement between the external threads of the first threaded member and the internal threads of the second threaded member.

With this arrangement in a mounted state, the resilient member is clamped and resiliently deformed between the flange of the first threaded member and the ring-shaped portion of the second threaded member. Therefore, due to the restoring force of the resilient member, the external threads of the first threaded portion and the internal threads of the second threaded portion may be forced axially in opposing directions. Consequently, the external threads and the internal threads may closely contact with each other within the engaging region. For at least this reason, any potential clearance or axial displacement may be reliably prevented or inhibited between the first threaded member and the second threaded member within the engaging region of the external threads and the internal threads. Any potential loosening of the engagement between the external threads of the first threaded member and the internal threads of the second threaded member may be eliminated or inhibited even if the vibrations of the vehicle body have been continuously transmitted to the vibrator or the interior trim panel, or even if a difference between the axial length of the external threads and the axial length of the internal threads is caused due to a difference in the linear coefficients of thermal expansion of the materials used in the audio device. As a result, the audio device may effectively produce the desired sounds via the vibrations of the vibrator.

In one embodiment of the present teachings, the first threaded member is made of resin and is fixedly mounted to the interior trim panel. In addition, the second threaded member is also made of resin and fixedly supports the vibrator in a direction perpendicular to the axis. The second threaded member movably supports the vibrator in an axial direction.

Since the first and second threaded portions are made of resin, the overall audio device may have a relatively lightweight construction. Therefore, the loading with respect to the weight applied to a voice coil of the vibrator may be reduced. As a result, any problematic reductions of the sound pressure produced by the audio device may be avoided or minimized.

In another embodiment of the present teachings, the resilient member has a modulus of elasticity in the range of about 0.05 MPa to 5 MPa. Setting of the modulus to be equal to or more than 0.05 MPa may prevent the vibrations of the vibrator from being absorbed by the resilient member so that a sufficient sound pressure may be obtained. In addition, the setting of the modulus to be equal to or less than 5 MPa may effectively absorb any potential difference between the axial length of the external threads and the axial length of the internal threads caused by a difference in the linear coefficients of thermal expansion.

In a further embodiment of the present teachings, the audio device further includes a stopper device disposed between the flange of the first threaded member and the ring-shaped portion of the second threaded member. The stopper device serves to limit the resilient deformation (i.e., compression) of the resilient member to a predetermined amount.

Therefore, during the operations of engaging the external threads of the first threaded member and the internal threads of the second threaded member, and tightening the external threads against the internal threads, the operator can recognize that the resilient member has been compressed by a predetermined amount when there is a perceptible increase in the reaction force opposing the tightening torque (in addition to the expected increase in the reaction force resulting primarily from the compression of the resilient member). Consequently, the assembly operation of the audio device can be easily performed.

In a still further embodiment of the present teachings, the vibrator includes an outer yoke forming a magnetic circuit of the vibrator. The outer yoke is connected to the second threaded member via a plurality of dampers made of other resilient members, for example, leaf springs. The dampers may be disposed along the circumference of the first threaded member and may be connected between the circumference of the first threaded member and the circumference of the outer yoke or the vibrator.

In another aspect of the present teachings, audio devices are taught that are adapted to be mounted to an interior trim panel defining a portion of the vehicle cabin. Audio devices are taught that vibrate the interior trim panel in order to produce audio sounds. The audio device includes a vibrator, a first threaded member, a second threaded member, and a biasing device. The first threaded member may support the vibrator. The second threaded member is engageable with the first threaded member and may be mounted to the interior trim panel. The biasing device is interposed between the first threaded member and the second threaded member in order to apply an axial force between the first threaded member and the second threaded member. The axial force functions so as to press the first threaded member against the second threaded member in an axial direction when the first threaded member is threadably engaged with the second threaded member. For example, the biasing device may be a resilient member such as a rubber.

In one embodiment, the first threaded member includes first threads and a first surface extending substantially perpendicular to the axis. The second threaded member is disposed coaxially with the first threaded member and includes second threads engageable with the first threads and a second surface extending substantially perpendicular to the axis and axially opposing the first surface. The resilient member may be clamped and compressed between the first surface and the second surface.

For example, a flange formed on the first threaded member may define the first surface. A ring-shaped portion formed on the second threaded member may define the second surface. The resilient member may have a ring-shaped configuration and may be disposed coaxially with the first threaded member and the second threaded member.

One of the first and second threads may be external threads. The other of the first and second threads may be internal threads.

The first threaded member may be made of resin and may be integrally molded with the first threads and the first surface. The second threaded member may also be made of resin and may be integrally molded with the second threads and the second surface.

DETAILED DESCRIPTION OF THE INVENTION

Each of the additional features and teachings disclosed above and below may be utilized separately or in conjunction with other features and teachings to provide improved vehicle audio devices and methods of manufacturing such audio devices. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Figure 1:
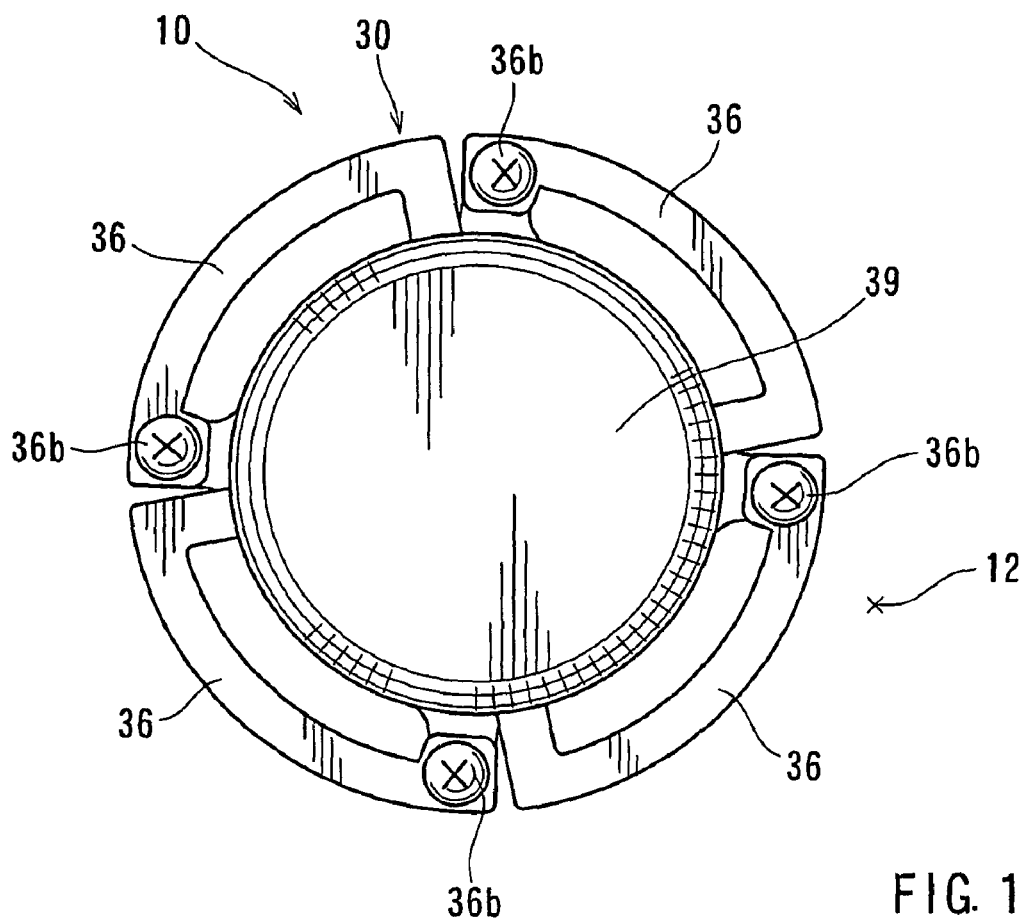
FIG. 1 is a plan view of a vehicle audio device according to a representative embodiment of the present invention.
Figure 2:
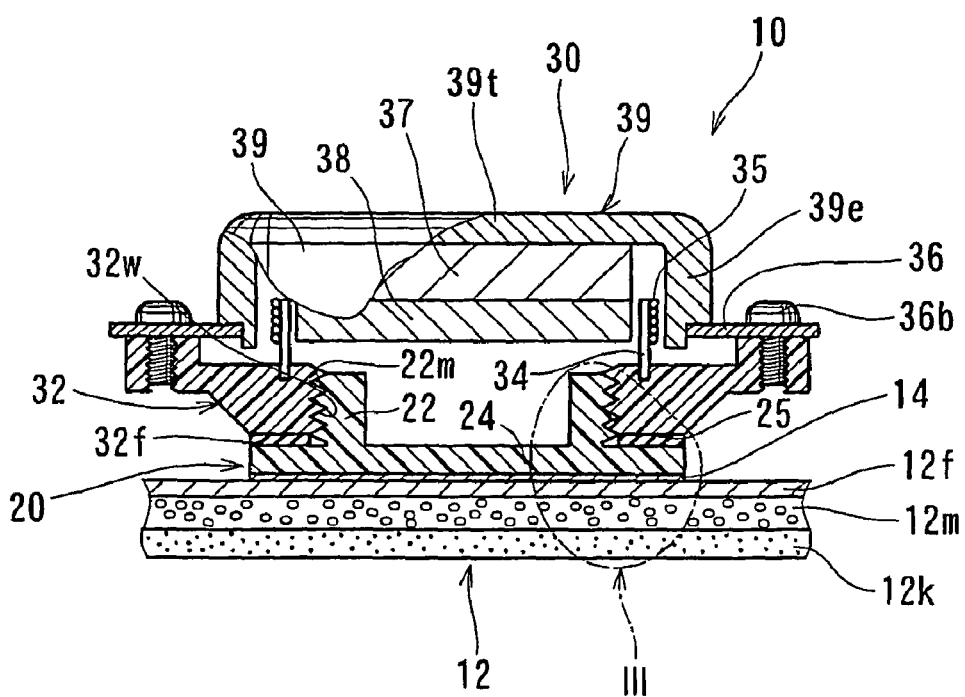
FIG. 2 is a vertical sectional view of the audio device.

A representative embodiment of the present invention will now be described with reference to FIGS. 1 to 4. Referring to FIGS. 1 and 2, a representative vehicle audio device 10 generally includes an interior trim panel 12 defining a portion of a vehicle cabin (not shown), a bracket 20 fixedly mounted to the interior trim panel 12, and a vibrator 30 (i.e., resonator) coupled to the bracket 20.

Figure 3:
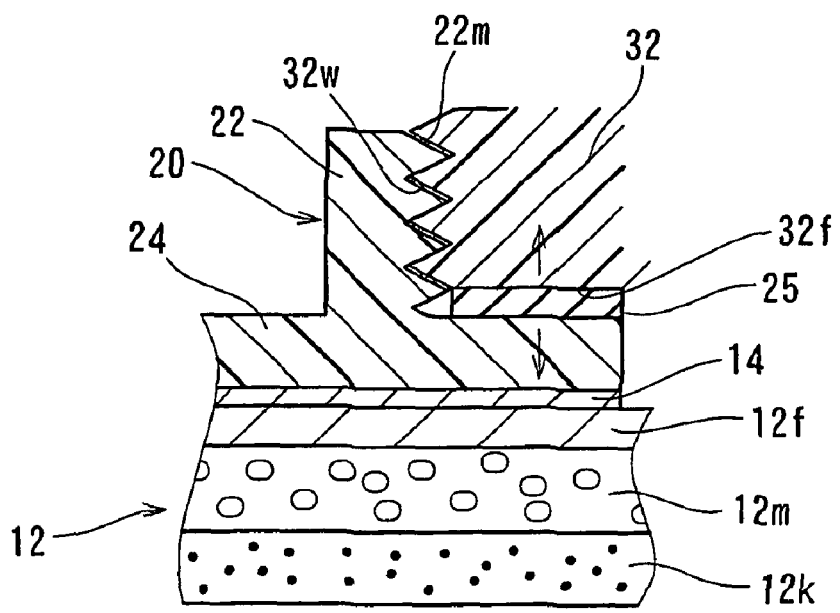
FIG. 3 is an enlarged view of a region indicated by the arrow III in FIG. 2.
Figure 4:
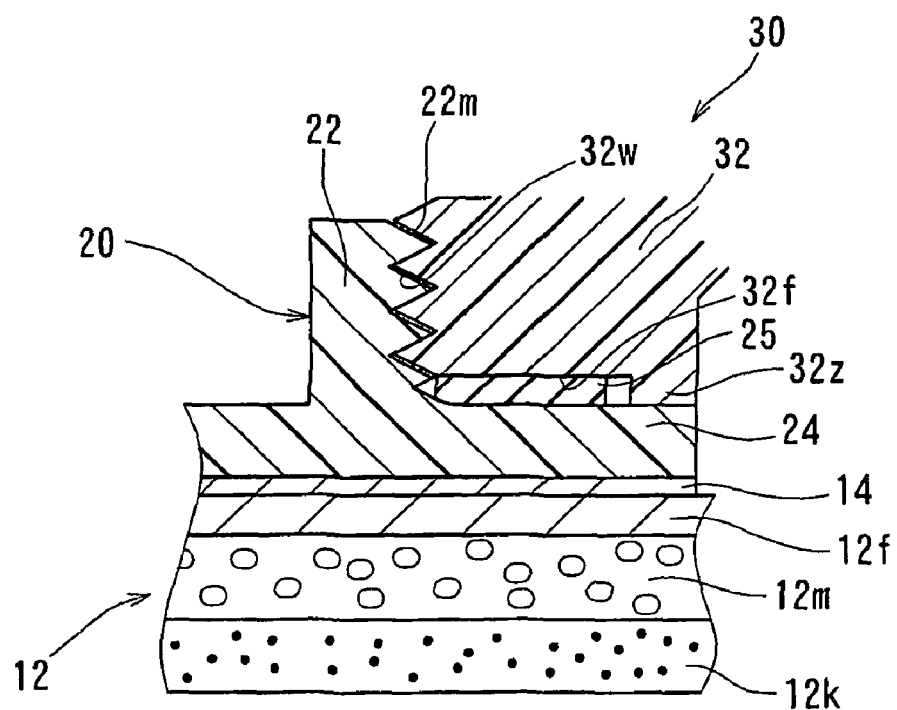
FIG. 4 is a view similar to FIG. 3 but showing an alternative embodiment.
Figure 5:
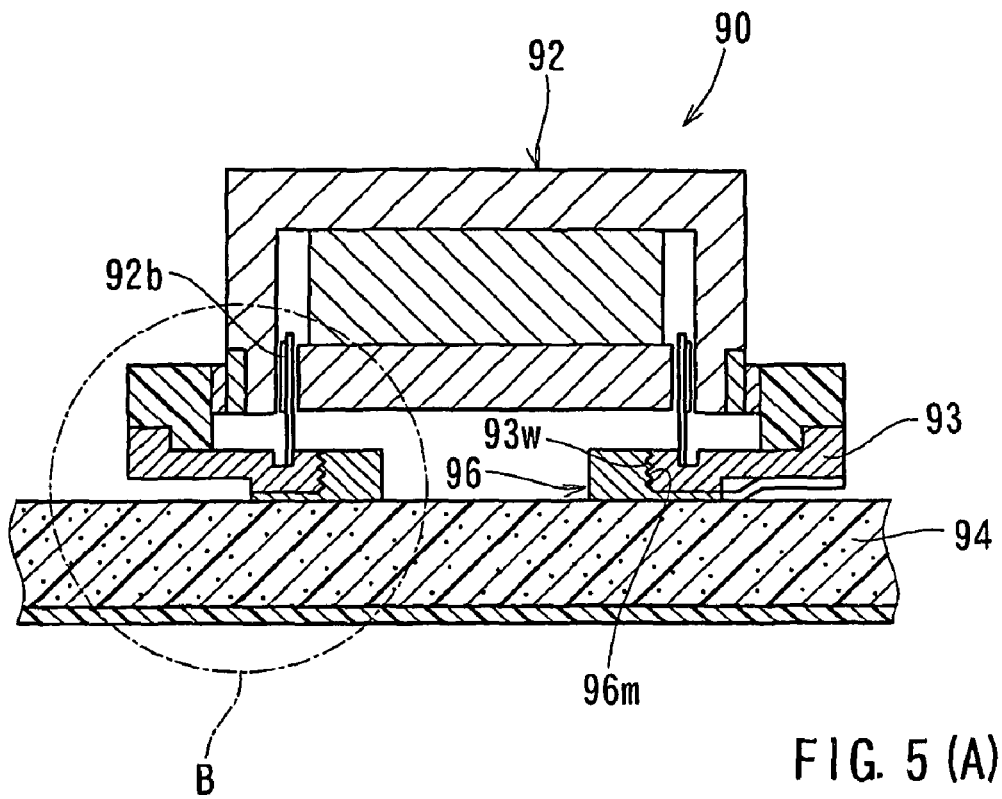
FIG. 5(A) is a vertical sectional view of a conventional vehicle audio device.
FIG. 5(B) is an enlarged view of a region indicated by the arrow B in FIG. 5(A).
Figure 5:
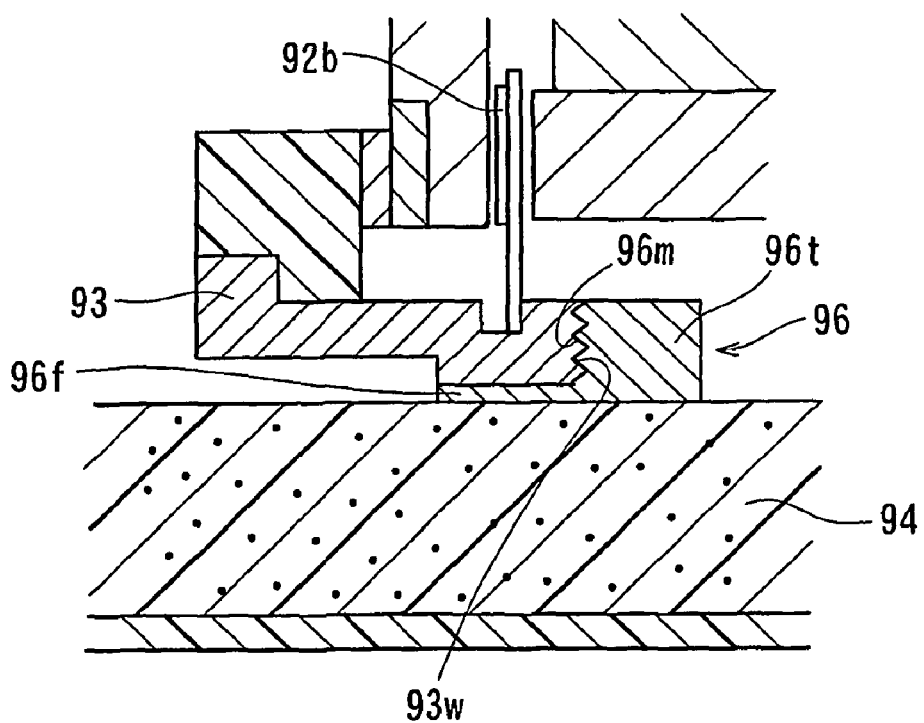

As shown in FIGS. 2, 3, and 4, the interior trim panel 12 may include a base layer 12m, a fibrous layer 12f overlaid on the back surface of the base layer 12m, and a surface layer 12k overlaid on the front surface of the base layer 12m. The bracket may be bonded to the fibrous layer 12f of the interior trim panel 12 via adhesive 14.

The bracket 20 may be made of resin and includes a tubular portion 22 and a disk-shaped flange 24. External threads 22m are formed on the outer peripheral surface of the tubular portion 22. The flange 24 is joined to the base end (i.e., the lower end as viewed in FIG. 2) of the tubular portion 22. In this representative embodiment, the back surface of the flange 24, on the side surface opposite of the tubular portion 22, is bonded to the fibrous layer 12f of the interior trim panel 12 via adhesive 14.

The vibrator 30 includes a ring-shaped holder 32 that is made of resin. Internal threads 32w are formed on an inner circumferential surface of the holder 32 so that the external thread portion 22m of the bracket 20 can engage the internal threads 32w. A ring-shaped flat surface 32f is defined at the terminal end (i.e., the lower end as viewed in FIGS. 2 and 3) of the holder 32 and extends about the internal threads 32w (i.e., beyond the radius defined by the internal threads 32w). In the configuration where the external threads 22m of the bracket 20 engage the internal threads 32w of the holder 32, the ring-shaped flat surface 32f of the holder 32 directly opposes the flange 24 of the bracket 20. In this representative embodiment, the outer diameter of the ring-shaped flat surface 32f is set to be equal to or substantially equal to the outer diameter of the flange 24 of the bracket 20.

A voice coil bobbin 34 is fixed to a base end (i.e., the upper end as viewed in FIG. 2) of the holder 32 and is positioned coaxially with the internal threads 32w. A voice coil 35 is wound around the voice coil bobbin 34. In addition, as shown in FIGS. 1 and 2, an outer yoke 39, which constitutes a magnetic circuit, is mounted to the outer circumferential edge of the base end of the holder 32 via dampers 36, made of spring plate material for example.

Each damper 36 has a substantially arc-shaped band-type of configuration in plan view and is adapted to mount the outer yoke 39 to the holder 32. The mounting is such that the outer yoke 39 is permitted to shift or move relative to the holder 32 in an axial direction. One circumferential end of each damper 36 is secured to the outer circumferential edge of the base end of the holder 32, for example, by means of a screw 36b. The other circumferential end of each damper 36 is fixed to the outer circumferential edge of the outer yoke 38 by a suitable means, such as welding. The dampers 36 are held to extend substantially parallel to the ring-shaped flat surface 32f of the holder 32. In this representative embodiment, four dampers 36 are provided and are arranged at regular intervals along the circumferential direction of the holder 32. However, the invention is not limited to four dampers 36, one, two, three, and five or more dampers 36 may be provided.

The outer yoke 39 has a cup-shaped configuration and includes a cylindrical tubular portion 39e and a disk-shaped top portion 39t. The cylindrical tubular portion 39e is held so as to be coaxial with the voice coil 35. The outer yoke 39 covers the voice coil 35 but does not contact the voice coil 35. To create this configuration, a circumferential end of each damper 36 is secured to the end surface of the cylindrical tubular portion 39e.

A disk-shaped magnet 37 is secured to the central portion of the inner wall of the disk-like top plate 39t of the outer yoke 39 and is positioned coaxially with the outer yoke 39. An inner yoke 38, having a disk-shaped configuration similar to the magnet 37, is secured to an end surface of the magnet 37 (i.e., the lower end surface as viewed in FIG. 2) and is positioned coaxially with the magnet 37. In this representative embodiment, the outer diameter of the magnet 37 and the outer diameter of the inner yoke 38 are set to be substantially equal to each other. In addition, the magnet 37 and the inner yoke 38 are positioned within the outer yoke 39 so as to not contact the voice coil bobbin 34. With this arrangement, the voice coil bobbin 34 and the voice coil 35 are positioned between the cylindrical tubular portion 39e of the outer yoke 39, and an assembly of the magnet 37 and the inner yoke 38, with respect to the diametrical direction. The voice coil bobbin 34 and the voice coil 35 are positioned so as to not contact these elements.

A ring-shaped resilient member 25 is interleaved between the holder 32 of the vibrator 30 and the flange 24 of the bracket 20. The resilient member 25 is positioned about the tubular portion 22 of the bracket 20. In this representative embodiment, the outer diameter of the resilient member 25 is set to be substantially equal to the outer diameter of the flange 24 of the bracket 20. In addition, the inner diameter of the resilient member 25 is set to be substantially equal to the outer diameter of the tubular portion 22 (i.e., the outer diameter of the external threads). Further, the resilient member 25 has a predetermined substantially uniform thickness.

The operation of the above representative embodiment will be described in connection with the process of mounting the vibrator 30 to the interior trim panel 12. First, the ring-shaped resilient member 25 is fitted onto the tubular portion 22 of the bracket 20. The bracket 20 may have been previously secured to the interior trim panel 12. The internal threads 32w of the holder 32 of the vibrator 30 are then threadably engaged with the external threads 22m of the tubular portion 22 of the bracket 20. Thereafter, with the internal threads 32w engaged with the external threads 22m, the holder 32 is rotated relative to the tubular portion 22 until the resilient member 25 is compressed. The resilient member 25 is resiliently deformed by a predetermined amount after clamping the resilient member 25 between the ring-shaped flat surface 32f and the flange 24 of the bracket 20. Consequently, the mounting operation of the vibrator 30 to the interior trim panel 12 may be completed when the internal threads 32w of the holder 32 have been threadably engaged with the external threads 22m of the bracket 20 substantially along the entire length of the external threads 22m in an axial direction.

In this configuration with the vibrator 30 thus mounted to the interior trim panel 12, the vibrator 30 may vibrate when an electric current signal is inputted to the voice coil 35. The vibration may then be transmitted from the vibrator 30 to the interior trim panel 12 via the holder 32 of the vibrator 30 and the bracket 20. Consequently, sound may be produced.

As previously described, the resilient member 25 is clamped between the holder 32 of the vibrator 30 and the flange 24 of the bracket 20 so as to be resiliently deformed or compressed. Therefore, the internal threads 32w of the holder 32 may be axially pressed against the external threads 22m of the bracket 20 in opposing directions (e.g., as indicated by arrows in FIG. 3) due to the restoring force of the resilient member 25. In other words, the internal threads 32w may closely contact with the external threads 22m within the engaging region. As a result, the vibrations of the vibrator 30 may be reliably transmitted to the interior trim panel 12 via the internal threads 32w of the holder 32 and the external threads 22m of the bracket 20.

In addition, because the internal threads 32w of the holder 32 may contact within the engaging region with the external threads 22m of the bracket 20 while they are pressed axially against each other, the internal threads 32w and the external threads 22m may not allow any significant displacement relative to an axial direction within the threaded engaging region. Therefore, the engagement between the internal threads 32w and the external threads 22m may not be loosened even if potential external vibrations or impacts have been continuously applied via the vehicle body to the vibrator 30 or the interior trim panel 12. The engagement may also not be loosened even if the length of the external threads 22m becomes different than the length of the internal threads 32w due to differences in their linear coefficients of thermal expansion. Further, the resilient member 25 may serve to prevent potential damage to the internal threads 32w and the external threads 22m. The resilient member 25 may prevent potential damage that may otherwise be caused if the internal threads 32w and the external threads 22m have been excessively tightened or over tightened.

Preferably, the modulus of elasticity of the resilient member 25 may be chosen from a value included in the range of about 0.05 MPa to 5 MPa. If the modulus is smaller than 0.05 MPa, the resilient member 25 may prevent the obtaining of a sufficient sound pressure due to of absorption of vibrations by the resilient member 25. On the contrary, if the modulus is greater than 5 MPa, the resilient member 25 may not effectively absorb a difference in the axial lengths between the external threads 22m and the internal threads 32w due to different linear coefficients of thermal expansion.

Preferably, the resilient member 25 may be made of rubber. Using a rubber resilient member 25 increases the frictional coefficient between the contact surfaces of the resilient member 25 and the holder 32 and the frictional coefficient between the contact surfaces of the resilient member 25 and the bracket 20. The increases in the frictional coefficients may help to prevent the loosening of the engagement between the external threads 22m and the internal threads 32w. More preferably, the resilient member 25 may be made of a silicon rubber material having a small permanent compression stress or may be made of silicon rubber foam providing a relatively small modulus of elasticity, such as approximately 0.8 MPa.

Further, in the representative embodiment the holder 32 of the vibrator 30 and the bracket 20 are made of resin. Therefore, the overall audio device may have a relatively lightweight construction. In addition, the weight load applied to the voice coil 35 may be reduced and consequently prevent a potential reduction of the sound pressure generated by the audio device.

Furthermore, in an alternative embodiment as shown in FIG. 4, a projection 32z (i.e., a stopper device) may be formed on the outer circumferential edge of the ring-shaped flat surface 32f of the holder 32 of the vibrator 30. With this arrangement, it is possible to prevent the distance between the flange 24 of the bracket 20 and the ring-shaped flat surface 32f of the holder 32 of the vibrator 30 from being reduced so as to be smaller than a predetermined or desired distance (i.e., the compression of the resilient member 25 is limited by the projection 32z). Therefore, during the operation of engaging the internal threads 32w of the holder 32 of the vibrator 30 and the external threads 22m of the bracket 20 and tightening the internal threads 32w against the external threads 22m, the operator can recognize, without needing to exactly control the tightening torque, that the resilient member 25 has been compressed by a predetermined amount. The operator is able to recognize this point when the reaction force (i.e., opposing the tightening force) has been significantly increased above the expected increase in the reaction force due primarily to the compression of the resilient member 25 during the tightening operation. As a result, this characteristic of the projection 32z or other configurations of spacers or stoppers may facilitate the assembly operation of the vibrator 30.

Further, although the internal threads 32w are formed on the holder 32 of the vibrator 30 and the external threads 22m are formed on the tubular member 22 of the bracket 20 in the above representative embodiment, this arrangement may be inverted.

In addition, although the projection 32z in the form of a cylindrical ring projection is formed on the holder 32 of the vibrator 30, the projection 32z or other configurations of stoppers or spacers may be formed on the flange 24 of the bracket 20 as an alternative arrangement. The projection 32z may be formed on the flange 24 in addition to the projection 32z formed on the holder 32 of the vibrator 30 or as an alternative to the projection 32z formed on the holder 32 of the vibrator 30.

The invention claimed is:

1. An audio device adapted to be mounted to the back of an interior trim panel defining a portion of a vehicle cabin and adapted to vibrate the interior trim panel in order to produce audio sounds, comprising:
    a vibrator,
    a first threaded member made of resin including a tubular portion, external threads formed on an outer surface of the tubular portion, a flange formed on one end of the tubular portion, and is fixedly mounted to the interior trim panel; and
    a ring-shaped resilient member arranged and constructed to be fitted around the tubular portion of the first threaded member and fitted to axially oppose the flange of the first threaded member; and
    a second threaded member made of resin including a ring-shaped portion arranged and constructed to axially oppose the resilient member from the side of the resilient member not opposing the flange of the first threaded member, and internal threads formed on an inner surface of the ring-shaped portion and engageable with the external threads of the first threaded member and movably supports the vibrator in an axial direction;
    wherein the vibrator is mounted to one of the first and second threaded members and includes an outer yoke formed to cover a magnetic circuit of the vibrator, and
    wherein the outer yoke is connected to the second threaded member via a plurality of dampers made of lead springs;
    wherein the resilient member is clamped and resiliently deformed between the flange of the first threaded member and the ring-shaped portion of the second threaded member through engagement between the external threads of the first threaded member and the internal threads of the second threaded member.

2. The audio device as in claim 1, wherein the resilient member has a modulus of elasticity of 0.05 MPa to 5 MPa.

3. The audio device as in claim 1,
    further comprising a stopper device disposed between the flange of the first threaded member and the ring-shaped portion of the second threaded member,
    wherein the stopper device is arranged and constructed to limit the resilient deformation of resilient member.

4. An audio device adapted to be mounted to the back of an interior trim panel defining a vehicle cabin and to vibrate the interior trim panel so as to produce audio sounds, comprising:
    a vibrator;
    a first threaded member arranged and constructed to support the vibrator;
    a second threaded member engageable with the first threaded member and arranged and constructed to be mounted to the back of the interior trim panel;
    a biasing device interposed between the first threaded member and the second threaded member in order to apply an axial force between the first threaded member and the second threaded member so as to press the first threaded member against the second threaded member in the axial direction when the first threaded member and the second threaded member are in an assembled configuration
    further comprising a mount device for mounting the vibrator to the first threaded member,
    wherein the mount device comprises a plurality of dampers disposed along the circumference of the first threaded member and connected between the circumference of the first threaded member and the circumference of the vibrator.

5. The audio device as in claim 4, wherein the biasing device comprises a resilient member adapted to be axially resiliently compressed between the first threaded member and the second threaded member.

6. The audio device as in claim 5, wherein the resilient member has a modulus of elasticity between 0.05 MPa and 5 MPa.

7. The audio device as in claim 5, wherein the resilient member comprises a rubber material.

8. The audio device as in claim 5,
wherein the first threaded member comprises first threads and a first surface extending substantially perpendicular to the axial direction;
wherein the second threaded member is disposed co-axially with the first threaded member and comprises second threads engageable with the first threads and a second surface extending substantially perpendicular to the axial direction and axially opposing the first surface,
wherein the resilient member is clamped and compressed between the first surface and the second surface.

9. The audio device as in claim 8, wherein the resilient member has a ring-shaped configuration and is disposed co-axially with the first threaded member and the second threaded member.

10. The audio device as in claim 8, wherein one of the first and second threads are external threads and the other of the first and second threads are internal threads.

11. The audio device as in claim 10,
wherein the first threaded member is made of resin and integrally molded with the first threads and the first surface, and
wherein the second threaded member is made of resin and integrally molded with the second threads and the second surface.

12. The audio device as in claim 5 further comprising a stopper device arranged and constructed to limit the amount of compression of the resilient member to a predetermined amount.

13. The audio device as in claim 12, wherein the stopper device comprises a projection formed on one of the first and second surfaces and extends toward the other of the first and second surfaces.

* * * * *